(12) United States Patent
Kanazawa

(10) Patent No.: US 9,444,968 B2
(45) Date of Patent: Sep. 13, 2016

(54) IMAGE FORMING APPARATUS THAT CONTINUES WITHOUT HALT TO PERFORM PRINT JOB INCLUDING SIGN WHERE GLYPH IS INVALID DATA, AND RECORDING MEDIUM

(71) Applicant: KYOCERA Document Solutions Inc., Osaka (JP)

(72) Inventor: Keizen Kanazawa, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/842,726

(22) Filed: Sep. 1, 2015

(65) Prior Publication Data

US 2016/0072978 A1 Mar. 10, 2016

(30) Foreign Application Priority Data

Sep. 5, 2014 (JP) ................................ 2014-181037

(51) Int. Cl.
*H04N 1/32* (2006.01)
*H04N 1/00* (2006.01)
*G06K 15/02* (2006.01)

(52) U.S. Cl.
CPC ...... *H04N 1/32144* (2013.01); *G06K 15/1822* (2013.01); *H04N 1/00244* (2013.01); *H04N 2201/0094* (2013.01); *H04N 2201/3269* (2013.01)

(58) Field of Classification Search
CPC ..................... H04N 1/32144; H04N 1/00244; H04N 2201/0094; H04N 2201/3269; G06K 15/1822

USPC ......................................................... 358/1.11
See application file for complete search history.

(56) References Cited

U.S. PATENT DOCUMENTS

| 6,047,093 | A | * | 4/2000 | Lopresti | G06K 9/03 382/310 |
| 6,076,738 | A | * | 6/2000 | Bloomberg | G06K 7/0166 235/456 |
| 7,493,250 | B2 | * | 2/2009 | Hecht | G06F 17/2809 235/454 |
| 2007/0263240 | A1 | * | 11/2007 | Hirai | G06F 17/214 358/1.11 |
| 2016/0072978 | A1 | * | 3/2016 | Kanazawa | H04N 1/32144 358/1.11 |

FOREIGN PATENT DOCUMENTS

JP 9-244831 A 9/1997

* cited by examiner

*Primary Examiner* — Allen H Nguyen
(74) *Attorney, Agent, or Firm* — Stein IP, LLC

(57) ABSTRACT

An image forming apparatus includes a print device, a sign printing circuit, and a sign analyzing circuit. The print device performs a print job onto a print medium. The sign printing circuit causes the print device to print a sign where a glyph is present in a font corresponding to a code based on the code included in print data. The sign analyzing circuit analyzes whether or not the glyph is invalid data where the sign printing circuit is not able to cause the print device to print. When the sign analyzing circuit analyzes that the glyph present in the font corresponding to the code of a target sign is the invalid data, the sign printing circuit causes the print device to print a specific alternative sign as an alternative to the target sign.

4 Claims, 10 Drawing Sheets

IMAGE FORMING APPARATUS THAT CONTINUES WITHOUT HALT TO PERFORM PRINT JOB INCLUDING SIGN WHERE GLYPH IS INVALID DATA, AND RECORDING MEDIUM

INCORPORATION BY REFERENCE

This application is based upon, and claims the benefit of priority from, corresponding Japanese Patent Application No. 2014-181037 filed in the Japan Patent Office on Sep. 5, 2014, the entire contents of which are incorporated herein by reference.

BACKGROUND

Unless otherwise indicated herein, the description in this section is not prior art to the claims in this application and is not admitted to be prior art by inclusion in this section.

As an image forming apparatus, there is known one technique that analyzes whether or not a font is invalid when the image forming apparatus causes a print device to print a sign, where a glyph is present in the font having being downloaded, based on print data. Here, "invalid" means that the image forming apparatus cannot cause the print device to print, and "valid" means that the image forming apparatus can cause the print device to print. The image forming apparatus downloads a valid font again when the font is invalid.

SUMMARY

An image forming apparatus according to one aspect of the disclosure includes a print device, a sign printing circuit, and a sign analyzing circuit. The print device performs a print job onto a print medium. The sign printing circuit causes the print device to print a sign where a glyph is present in a font corresponding to a code based on the code included in print data. The sign analyzing circuit analyzes whether or not the glyph is invalid data where the sign printing circuit is not able to cause the print device to print. When the sign analyzing circuit analyzes that the glyph present in the font corresponding to the code of a target sign is the invalid data, the sign printing circuit causes the print device to print a specific alternative sign as an alternative to the target sign.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
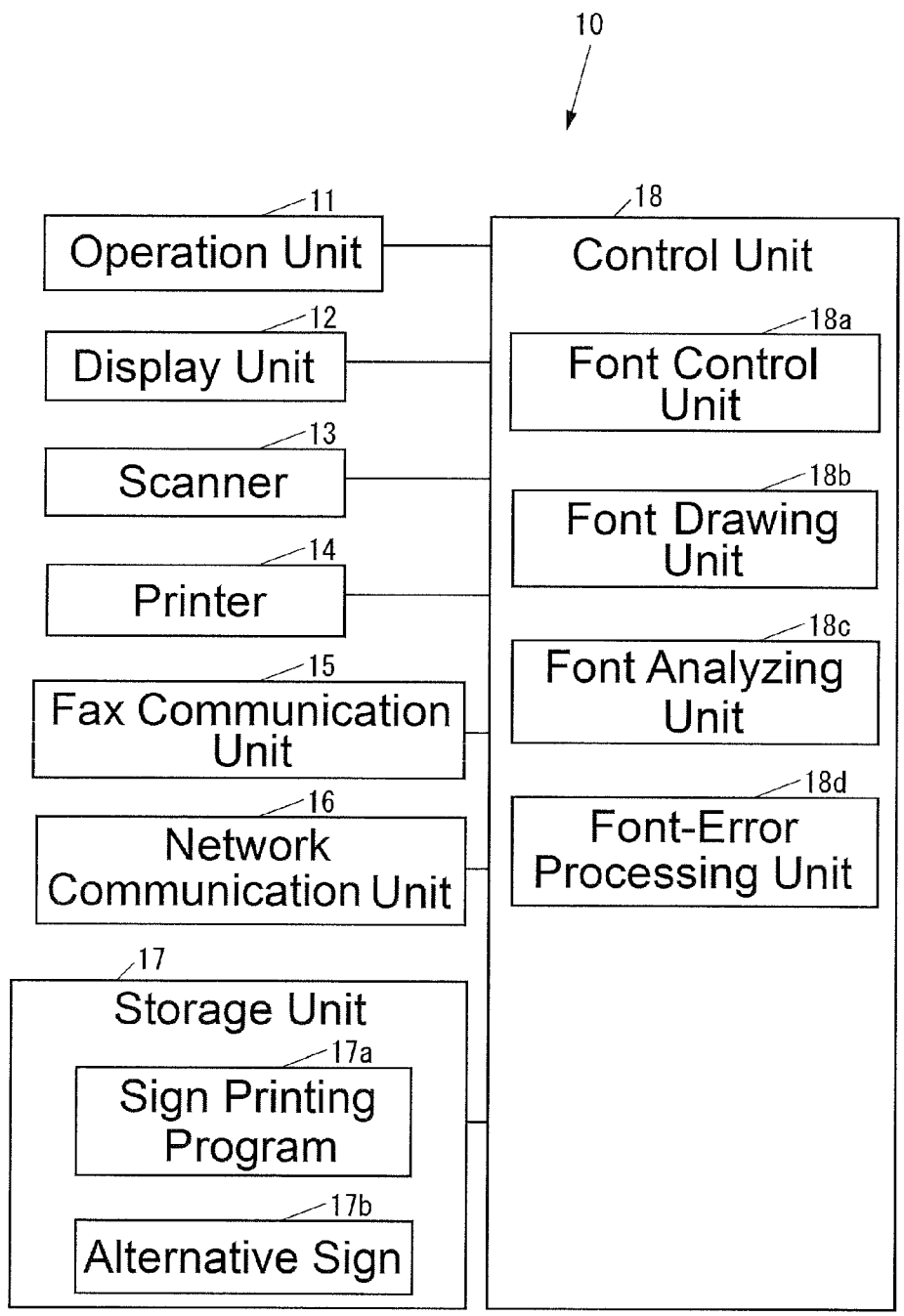
FIG. 1 is a schematic diagram illustrating a functional block configuration of a multi-functional peripheral (MFP) according to one embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes one embodiment of the disclosure with reference to the drawings.

First, a description will be given of a configuration of a Multifunction Peripheral (MFP) as an image forming apparatus according to the embodiment.

FIG. 1 is a schematic diagram illustrating a functional block configuration of an MFP 10.

As illustrated in FIG. 1, the MFP 10 includes an operation unit 11, a display unit 12, a scanner 13, a printer 14, a fax communication unit 15, a network communication unit 16, a storage unit 17, and a control unit 18. The operation unit 11 is an input device such as buttons to input various kinds of operations. The display unit 12 is a display device to display various kinds of information. The scanner 13 is a reading device to read an image from a document. The printer 14 is a print device for performing a print job onto a print medium such as a paper sheet. The fax communication unit 15 is a fax device for performing fax communication with an external facsimile device (not illustrated) via a communication line such as a dial-up line. The network communication unit 16 is a network communication device communicating with an external device via a network such as a Local Area Network (LAN) or the Internet. The storage unit 17 is a storage device such as an Electrically Erasable Programmable Read Only Memory (EEPROM) or a Hard Disk Drive (HDD), which stores various kinds of data. The control unit 18 controls the whole MFP 10.

Figure 2:
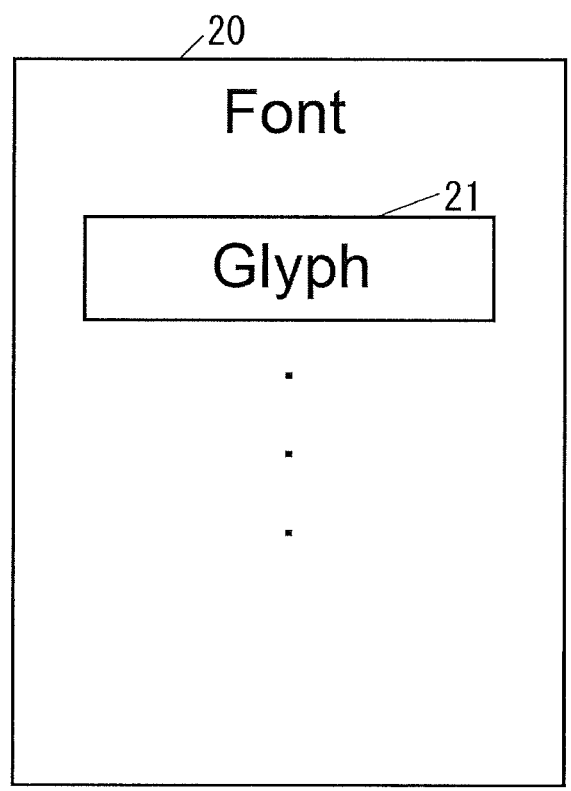
FIG. 2 is a schematic diagram illustrating an exemplary font included in print data received by the MFP according to the one embodiment.

FIG. 2 is a schematic diagram illustrating an exemplary font included in print data received by the MFP 10.

As illustrated in FIG. 2, the font 20 includes a glyph 21 as image data, which represents a sign such as a character, for the respective signs. The glyph 21 is present in the font 20 corresponding to a character code as a code for identification of the sign.

As illustrated in FIG. 1, the storage unit 17 stores a sign printing program 17a for causing the printer 14 to print the sign based on the character code included in the print data. The sign printing program 17a may be installed in the MFP 10 at production stage of the MFP 10, or may be additionally installed in the MFP 10 from a storage medium such as a SD card or a Universal Serial Bus (USB), or may be additionally installed in the MFP 10 on the network.

The storage unit 17 stores a specific alternative sign 17b used as an alternative to the sign where the glyph 21 (see FIG. 2) of the font 20 (see FIG. 2) included in the print data is invalid data. The alternative sign 17b is, for example, "♦."

The control unit 18 includes, for example, a Central Processing Unit (CPU), a Read Only Memory (ROM) storing programs and various kinds of data, and a Random Access Memory (RAM) used as a work area for the CPU. The CPU executes the programs stored in the ROM as a non-transitory and computer-readable recording medium or the storage unit 17.

Figure 3:
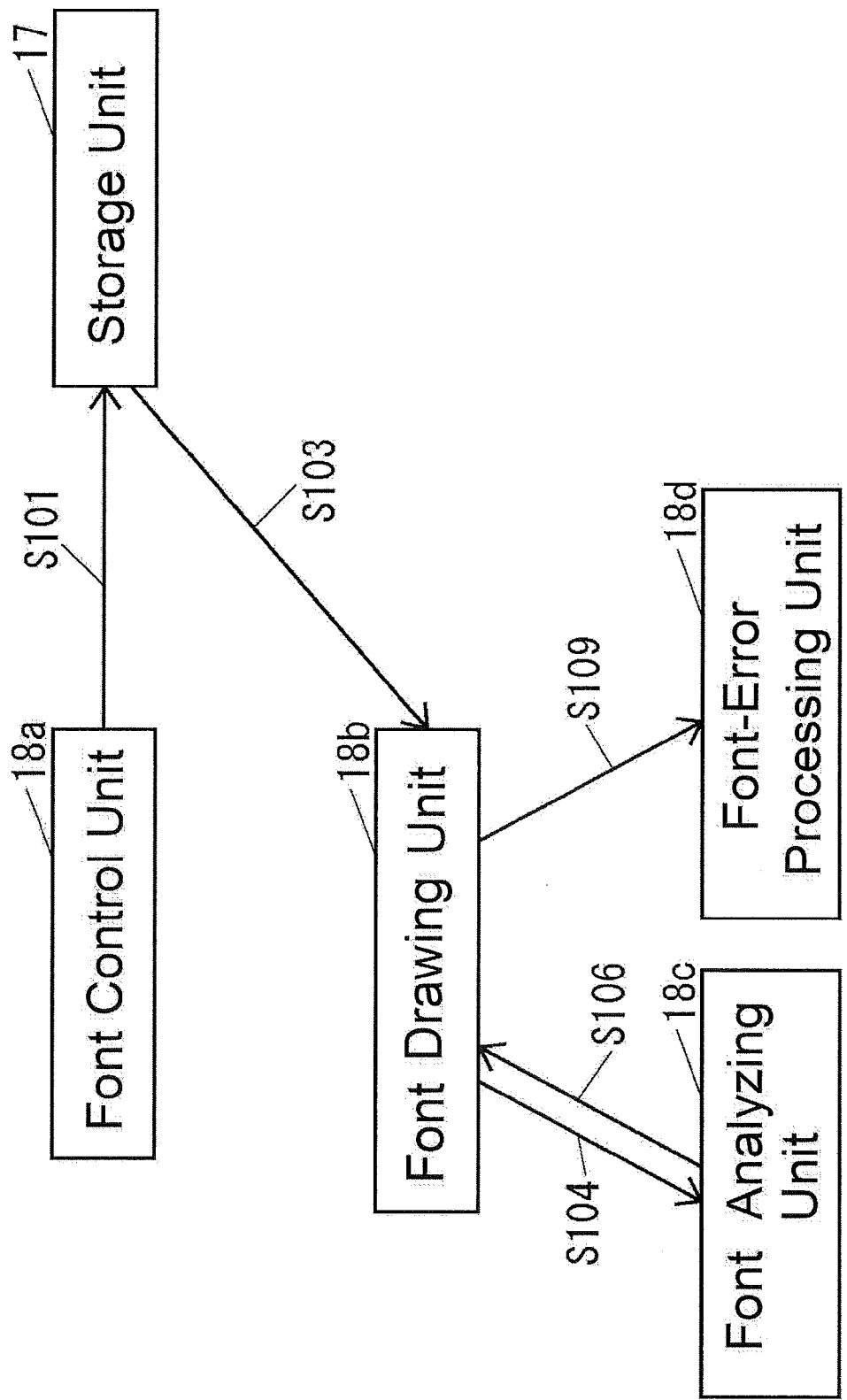
FIG. 3 is a schematic diagram illustrating functions performed by a control unit according to the one embodiment.

FIG. 3 is a schematic diagram illustrating functions performed by the control unit 18.

The control unit 18 executes the sign printing program 17a stored in the storage unit 17, as illustrated in FIG. 3, to function as a font control unit 18a, a font drawing unit 18b, a font analyzing unit 18c, and a font-error processing unit 18d. The font control unit 18a performs extraction of the font 20 (see FIG. 2) to the storage unit 17. The font drawing unit 18b is a sign printing unit causing the printer 14 (see FIG. 1) to print the sign based on the character code included in the print data. The font analyzing unit 18c is a sign analyzing unit that analyzes whether or not the glyph 21 (see FIG. 2) is the invalid data where the font drawing unit 18b cannot cause the printer 14 to print. The font-error processing unit 18d is the sign printing unit causing the printer 14 to print the alternative sign 17b (see FIG. 1). The sign printing unit is also referred to as a "sign printing circuit." The sign analyzing unit is also referred to as a "sign analyzing circuit."

The font-error processing unit 18d configures a report printing unit causing the printer 14 to print a font-analysis report as a report indicating that the glyph 21 of the sign, where the alternative sign 17b has been printed, is the invalid data.

Next, a description will be given of an operation of the MFP 10.

A user can transmit the print data including the font 20 to the MFP 10 from a computer such as a Personal Computer (PC) via the network. The MFP 10 performs the operation illustrated in FIGS. 4A and 4B when the MFP 10 receives the print data including the font 20 via the network communication unit 16.

Figure 4A:
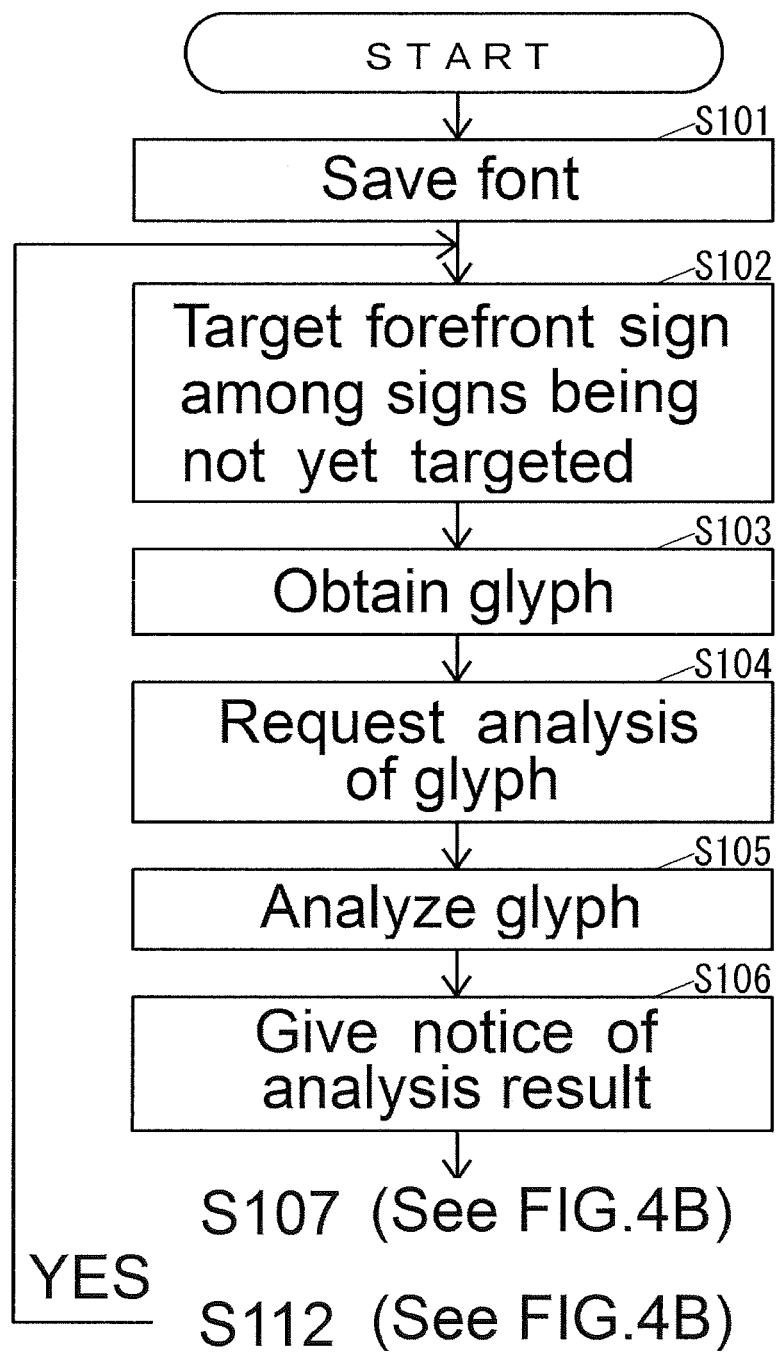
FIGS. 4A and 4B are flowcharts of an exemplary operation performed by the MFP according to the one embodiment when performing a print job based on the print data including the font.
Figure 4B:
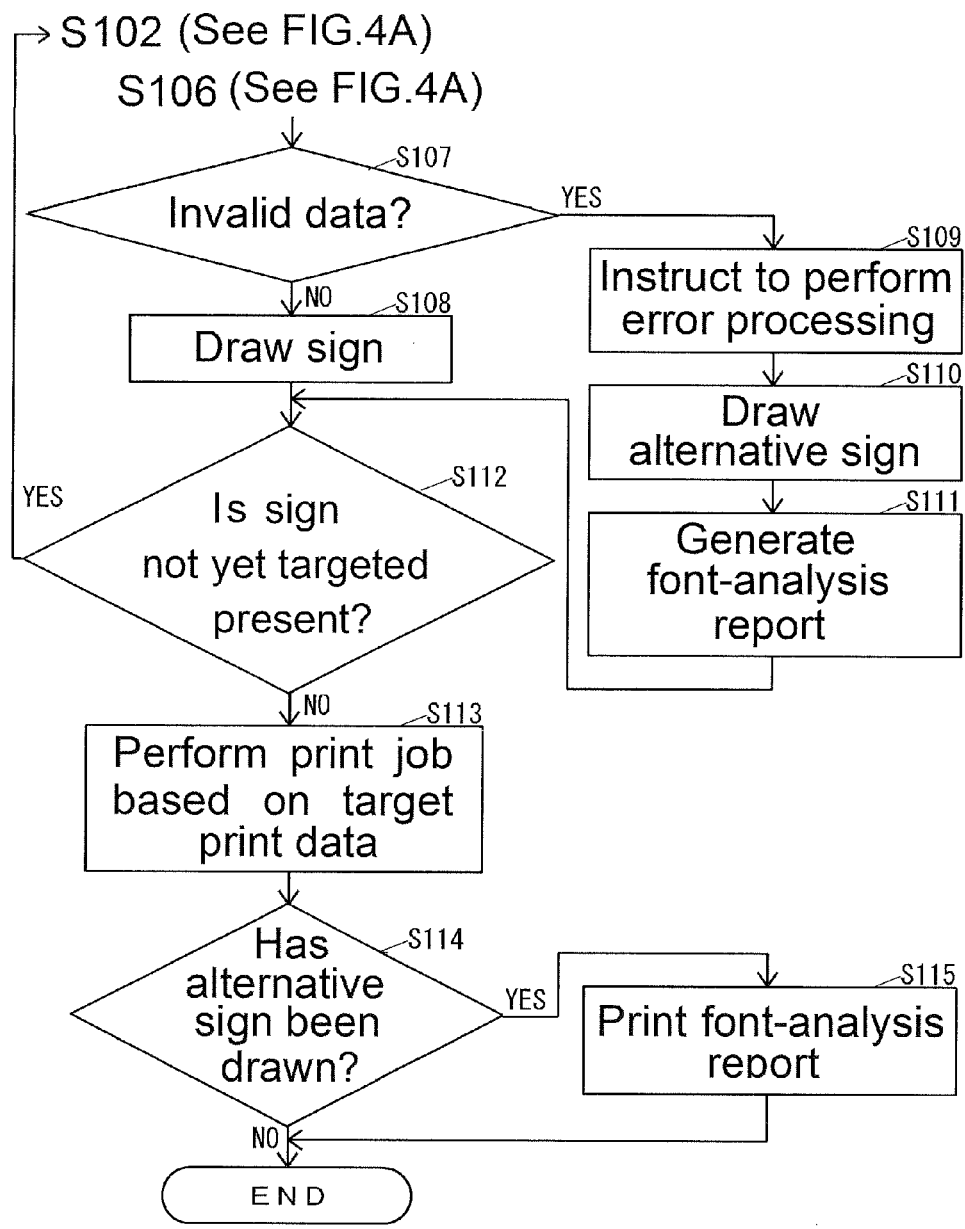

FIGS. 4A and 4B are flowcharts of an exemplary operation performed by the MFP 10 when performing a print job based on the print data including the font 20.

As illustrated in FIG. 4A, when the font 20 included in the print data (hereinafter referred to as "target print data") received via the network communication unit 16, namely a downloaded font is used in the print job based on the target print data, the font control unit 18a performs extraction of the font 20 to the storage unit 17. Accordingly, the font control unit 18a saves the font 20 into the storage unit 17 (Step S101).

Next, the font drawing unit 18b targets the forefront sign among the signs that has not been yet targeted in the whole list of signs based on the character code included in the target print data (Step S102).

Next, the font drawing unit 18b obtains the glyph 21 of the target sign from the font 20 saved in the storage unit 17 at Step S101 based on the character code of the target sign (Step S103). Then, the font drawing unit 18b requests analysis of whether or not the glyph 21 obtained at Step S103 is the invalid data to the font analyzing unit 18c (Step S104).

Next, the font analyzing unit 18c analyzes whether or not the glyph 21, which is requested to analyze at Step S104, is the invalid data (Step S105), and gives notice of a analysis result at Step S105 to the font drawing unit 18b (Step S106).

Next, the font drawing unit 18b determines whether or not the notice of the analysis result that the glyph 21 is the invalid data has been given at Step S106 (Step S107).

When the font drawing unit 18b determines at Step S107 that the notice of the analysis result that the glyph 21 is not the invalid data has been given at Step S106, the font drawing unit 18b draws the target sign based on the glyph 21 obtained at Step S103 (Step S108).

When the font drawing unit 18b determines at Step S107 that the notice of the analysis result that the glyph 21 is the invalid data has been given at Step S106, the font drawing unit 18b instructs the font-error processing unit 18d to perform error processing (Step S109).

Next, the font-error processing unit 18d received an instruction at Step S109 draws the alternative sign 17b as the alternative to the target sign (Step S110).

Next, the font-error processing unit 18d generates a font-analysis report which indicates that the glyph 21 of the target sign is the invalid data (Step S111).

When the process of Step S108 or Step S111 terminates, the font drawing unit 18b determines whether or not a sign that has not been yet targeted is present in the whole list of signs based on the character code included in the target print data (Step S112).

When the font drawing unit 18b determines that the sign that has not been yet targeted is present at Step S112, the font drawing unit 18b performs the process of Step S102.

On the other hand, when the font drawing unit 18b determines that the sign that has not been yet targeted is not present, namely the whole list of signs based on the character code included in the target print data has been targeted at Step S112, the font drawing unit 18b performs the print job based on the target print data (Step S113). That is, the font drawing unit 18b causes the printer 14 to perform the print job based on drawings in the process at Step S108 and in the process at Step S110.

Figure 5:
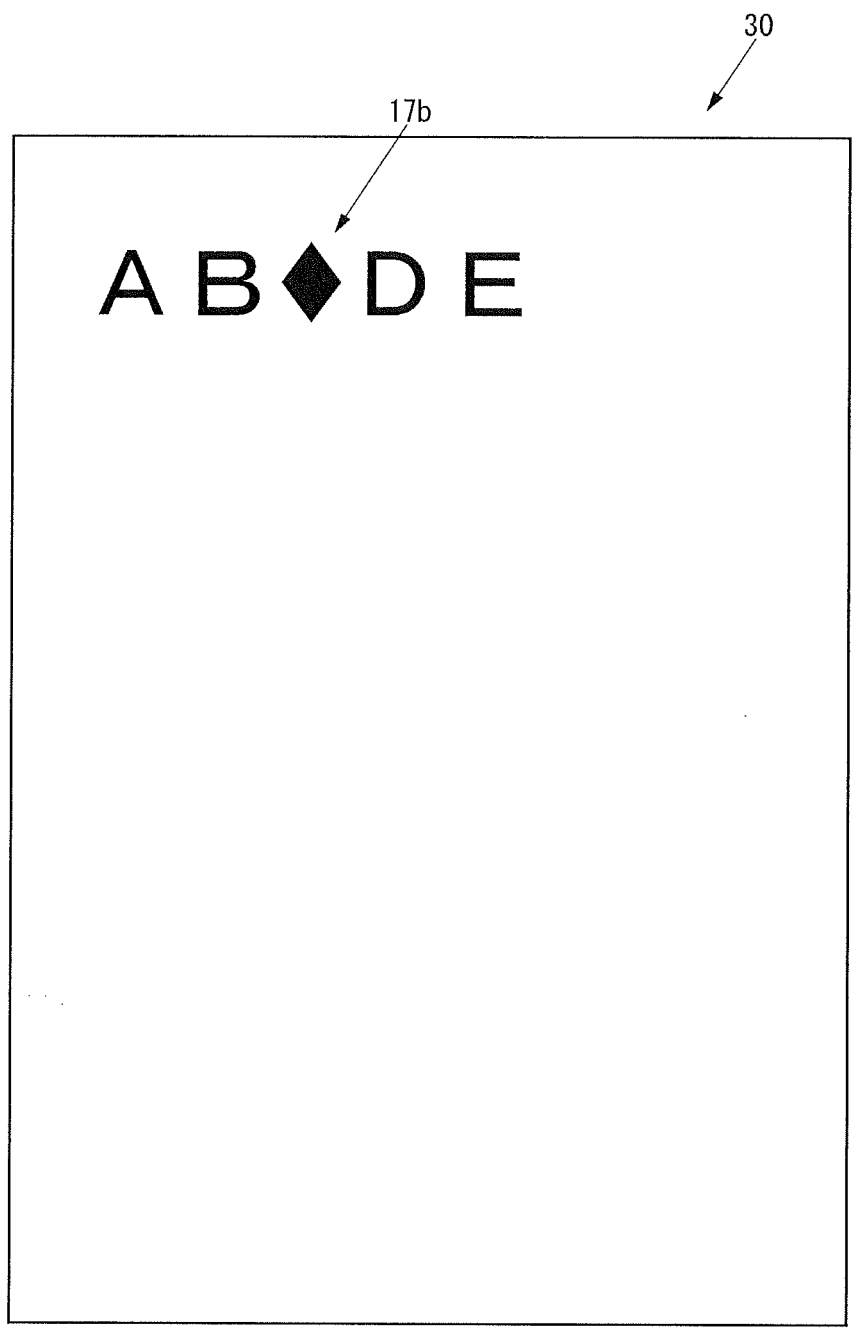
FIG. 5 is a schematic diagram illustrating an exemplary printed matter printed by a printer in the operation performed by the MFP according to the one embodiment.

FIG. 5 is a schematic diagram illustrating an exemplary printed matter printed by the printer 14 in the operation performed by the MFP at Step S113 illustrated in FIG. 4B.

In the printed matter 30 illustrated in FIG. 5, "♦" between "B" and "D" is the alternative sign 17b drawn in the process at Step S110. Though the print data for the printed matter 30 illustrated in FIG. 5 is originally the print data where a character string of "ABCDE" is to be drawn, "♦" as the alternative sign 17b is drawn as the alternative to "C" because the glyph 21 of "C" is the invalid data. Furthermore, in FIG. 5, "♦" as the alternative sign 17b has a color, such as black, identical to a color of "B" and "D" as the signs printed adjacent to "♦" as the alternative sign 17b by the printer 14 caused by the font drawing unit 18b.

As illustrated in FIG. 4B, after the process at Step S113, the font-error processing unit 18d determines whether or not the alternative sign 17b has been drawn, namely whether or not the process at Step S110 has been performed (Step S114).

When the font-error processing unit 18d determines that the alternative sign 17b has been drawn at Step S114, the font-error processing unit 18d causes the printer 14 to print the font-analysis report (Step S115).

Figure 6:
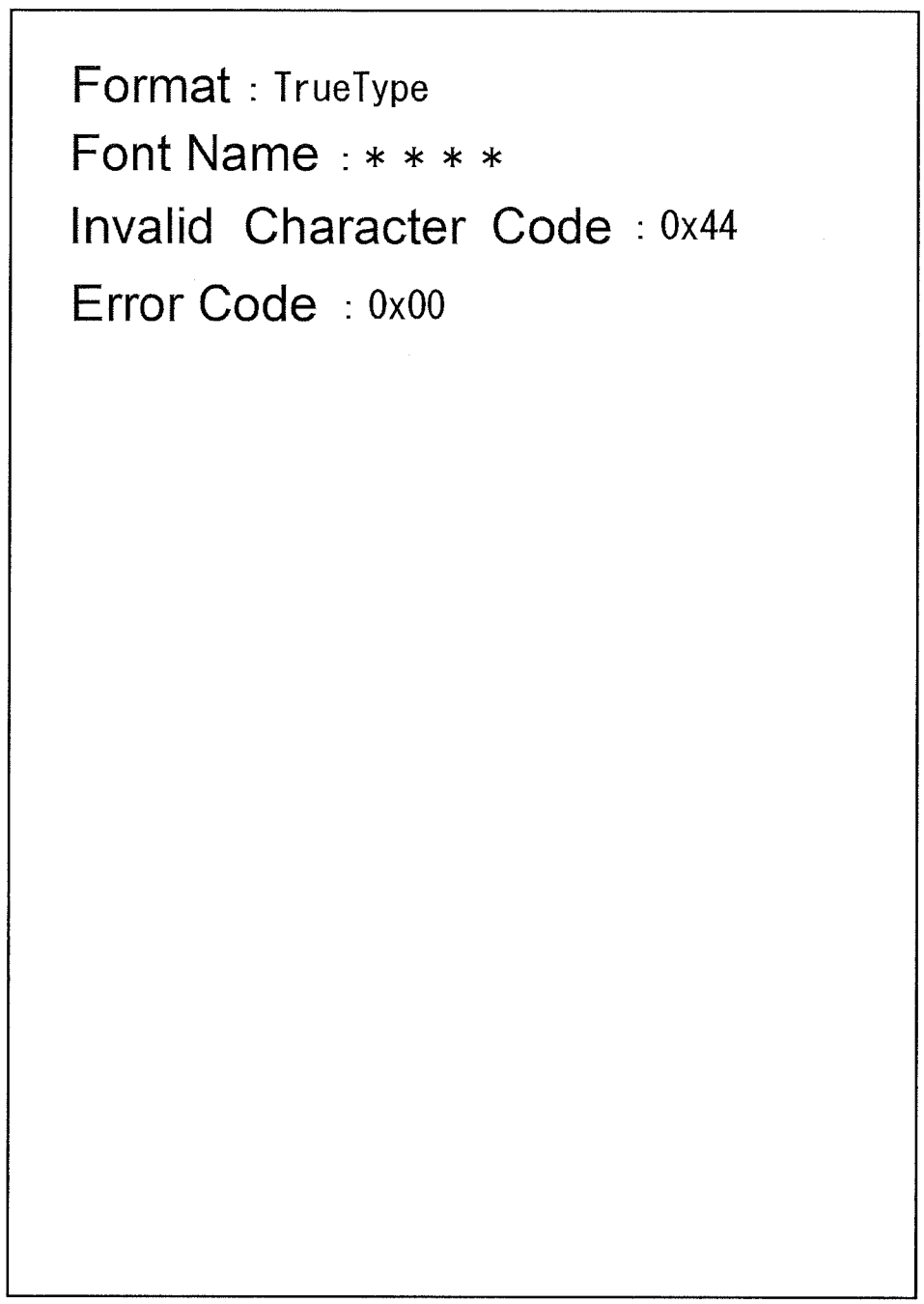
FIG. 6 is a schematic diagram illustrating an exemplary font-analysis report printed by the printer according to the one embodiment.

FIG. 6 is a schematic diagram illustrating an exemplary font-analysis report 40 printed by the printer 14 at Step S115.

The font-analysis report 40 illustrated in FIG. 6 includes: a "format" indicating the format of the font of the sign (hereinafter referred to as an "invalid sign") where the alternative sign 17b has been drawn as the alternative to the sign, a "font name" indicating the name of the font of the invalid sign, an "invalid character code" indicating the code of the invalid sign, and an "error code" indicating what kind of invalid data the glyph of the invalid sign is.

As illustrated in FIG. 4B, when the font-error processing unit 18d determines that the alternative sign 17b has not been drawn at Step S114, or the process at Step S115 terminates, the operation illustrated in FIGS. 4A and 4B terminates.

Figure 7A:
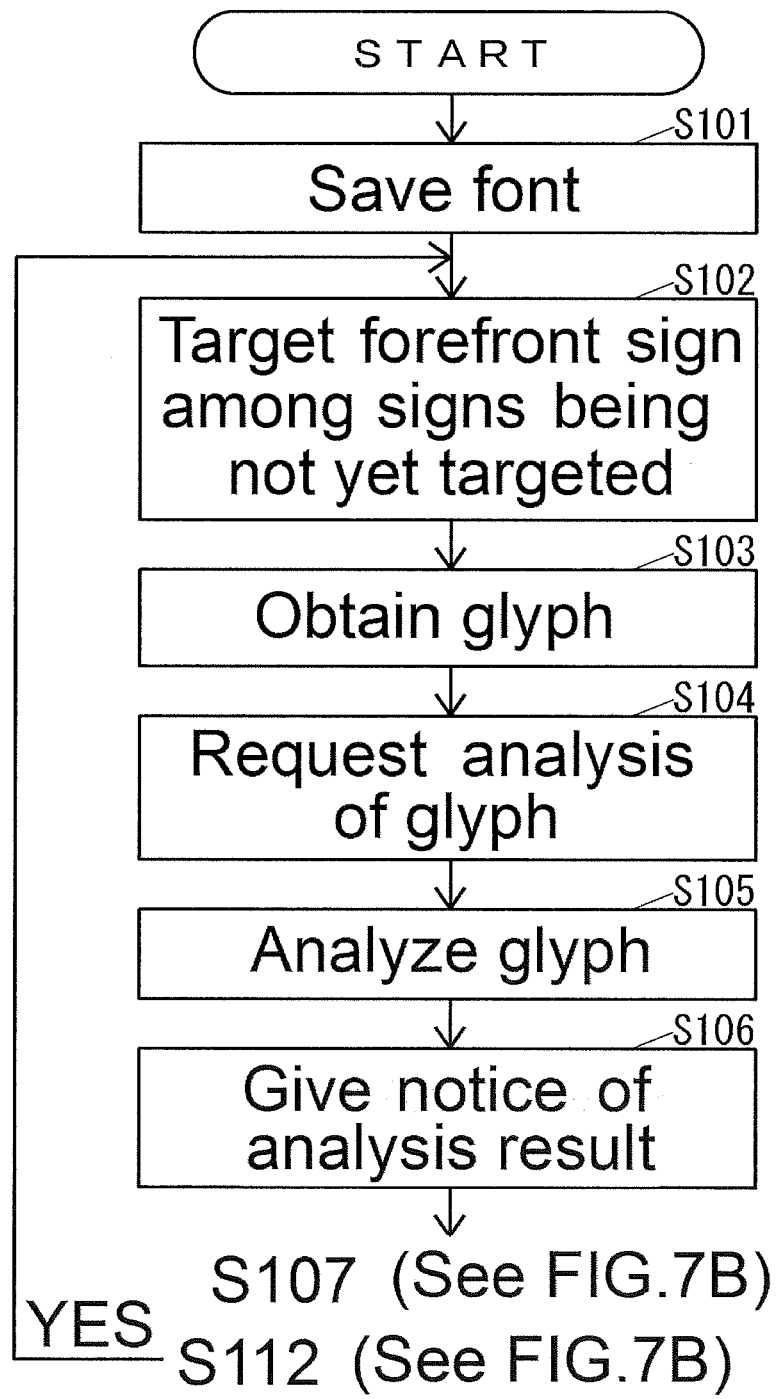
FIGS. 7A and 7B are flowcharts of the operation performed by the MFP according to another embodiment when performing the print job based on the print data including the font.
Figure 7B:
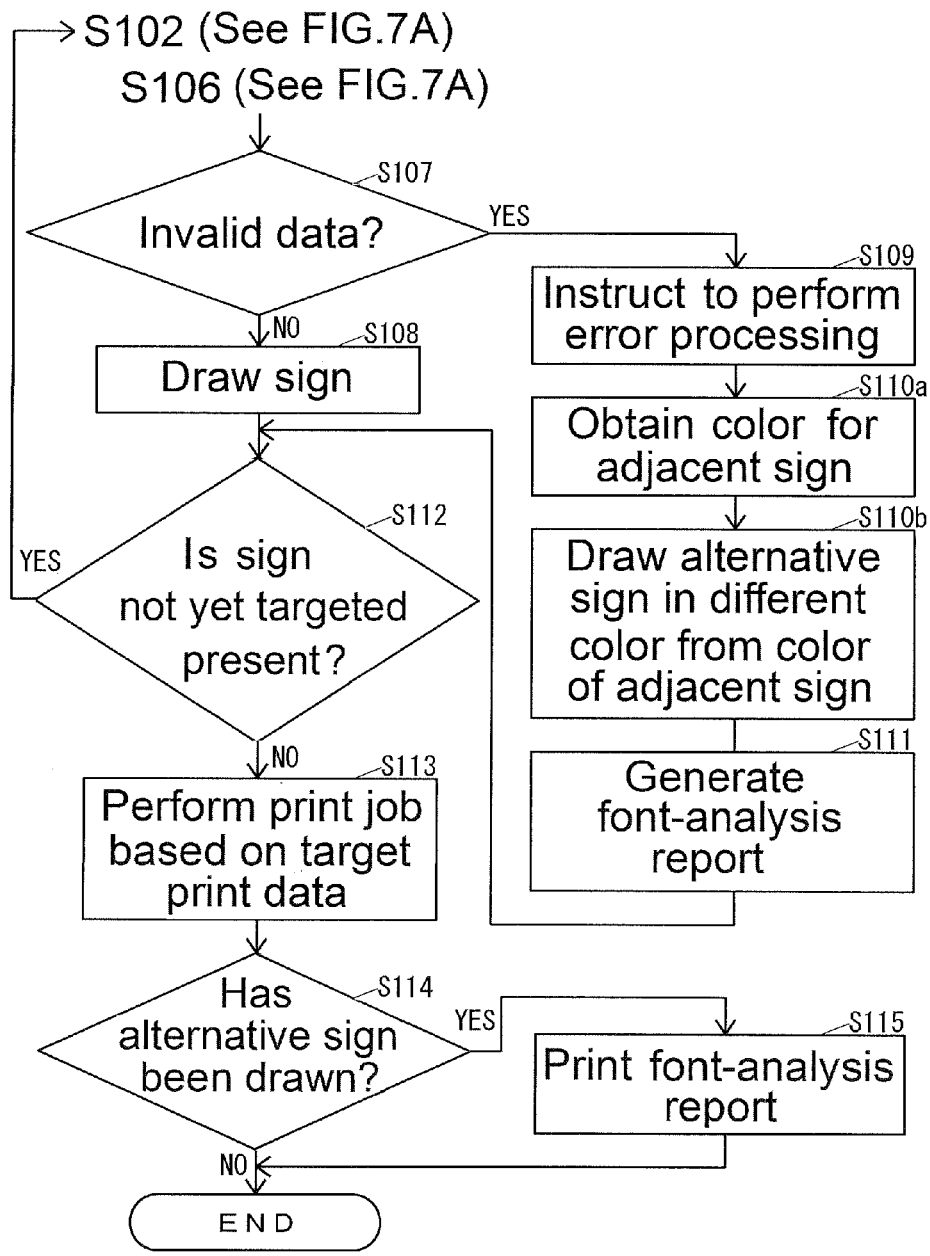

When the printer 14 is a color printer, the MFP 10 may perform the operation illustrated in FIGS. 7A and 7B instead of the operation illustrated in FIGS. 4A and 4B.

FIGS. 7A and 7B are flowcharts of the operation performed by the MFP 10 when performing the print job based on the print data including the font 20, The operation illustrated in FIGS. 7A and 7B is a different example from that illustrated in FIGS. 4A and 4B.

The flowchart illustrated in FIGS. 7A and 7B is identical with the flowchart illustrated in FIGS. 4A and 4B, except that Step S110a and Step S110b are included instead of Step S110 in the flowchart illustrated in FIGS. 4A and 4B.

As illustrated in FIG. 7B, the font-error processing unit 18d having received the instruction at Step S109 obtains a color for the sign which the font drawing unit 18b causes the printer 14 to print adjacent to the target sign (Step S110a).

Next, the font-error processing unit 18d draws the alternative sign 17b as the alternative to the target sign in a different color from the color obtained at Step S110a (Step S110b).

Figure 8:
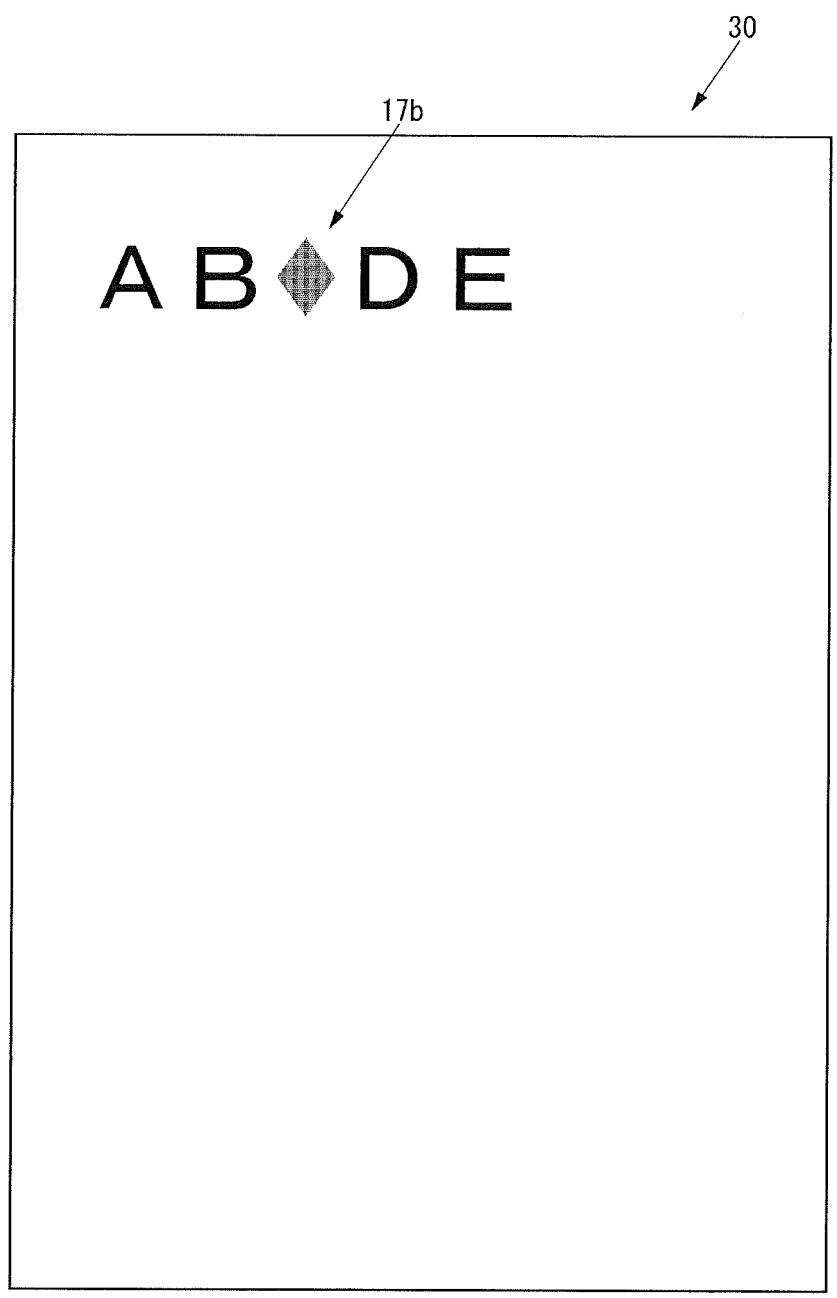
FIG. 8 is a schematic diagram illustrating an exemplary printed matter printed by the printer in the operation performed by the MFP according to the other embodiment.

Accordingly, the printed matter 30 printed by the printer 14 at Step S113 in the operation illustrated in FIG. 7B is indicated, for example, as illustrated in FIG. 8.

FIG. 8 is a schematic diagram illustrating an exemplary printed matter printed by the printer 14 in the operation performed by the MFP 10 at Step S113 illustrated in FIG. 7B.

In the printed matter 30 illustrated in FIG. 8, different from the printed matter 30 illustrated in FIG. 5, the color of "♦" as the alternative sign 17b drawn as the alternative to "C" is different from the color of "B" and "D." That is, the font drawing unit 18b causes the printer 14 to print "B" and "D" in black and "♦" in red, for example, thus causing the printer 14 to print "B" and "D" as the signs printed adjacent to "♦" as the alternative sign 17b in a color different from the color of "♦" as the alternative sign 17b.

As described above, since the MFP 10 causes the printer 14 to print the specific alternative sign 17b as the alternative to the sign where the glyph 21 is the invalid data (Step S110 or Step S110b, and Step S113), the MFP 10 can continue a sequence of print jobs including the print job of the sign where the glyph 21 is the invalid data till end without a halt.

Since the MFP 10 causes the printer 14 to print the specific alternative sign 17b as the alternative to the sign where the glyph 21 is the invalid data (Step S110 or Step S110b, and Step S113), the MFP 10 can indicate a position at which the sign, where the glyph 21 is the invalid data, is to be printed in the printed matter 30.

As illustrated in FIG. 8, when the MFP 10 causes the printer 14 to print the sign adjacent to the alternative sign 17b in a color different from a color of the alternative sign 17b, the MFP 10 indicates the alternative sign 17b by causing the alternative sign 17b to be eye-catching by the color in the printed matter 30. Thus, the MFP 10 can further clarify the position at which the sign, where the glyph 21 is the invalid data, is to be printed in the printed matter 30.

There is also conceived a method where the MFP 10 causes the printer 14 to print nothing, including the alternative sign 17b, in the position at which the sign, where the glyph 21 is the invalid data is to be printed. However, in this method, there is a possibility that the user does not recognize that the sign, where the glyph 21 is the invalid data, is to be printed and misunderstands. For example, when a character string of "¥123,456" is printed and the glyph 21 of "3" is the invalid data, the character string is displayed as "¥12,456," and the digit number of the amount is likely to be misunderstood. Since the MFP 10 prints the alternative sign 17b as "¥12♦,456," the MFP 10 can cause the user to clearly recognize that the sign, where the glyph 21 is the invalid data, is to be printed.

In the above-described example, the print data including the font 20 includes the glyph 21. Since there is a possibility that the glyph 21 included in the print data is not created by an expert of creation of the glyph 21, it is very likely that the glyph 21 is the invalid data compared with the glyph 21 originally stored in the MFP 10. Accordingly, when the glyph 21 of the sign is included in the print data, there is a great advantage that the MFP 10 can continue a sequence of print jobs including the print job of the sign where the glyph 21 is the invalid data without a halt. Furthermore, the embodiment also has the advantage that can continue print jobs even when a download target valid font is not originally present or when a download target valid font cannot be downloaded again for some reason without a halt.

The MFP 10 may perform the operation illustrated in FIGS. 4A and 4B based on the font 20 originally stored in the MFP 10.

Since the MFP 10 causes the printer 14 to print the font-analysis report 40 (Step S115) as the report indicating that the glyph 21 of the sign where the alternative sign 17b is printed, namely the invalid sign is the invalid data, the MFP 10 can cause the user to recognize the sign where the glyph 21 is the invalid data.

The MFP 10 can cause the user to recognize the sign, where the glyph 21 is the invalid data, without omission by the alternative sign 17b in the printed matter 30 and the font-analysis report 40.

Though the MFP 10 saves the font 20 in the storage unit 17 at Step S101, the MFP 10 may save the font 20 into a storage device other than the storage unit 17. For example, the MFP 10 may save the font 20 to the RAM of the control unit 18 at Step S101.

While the image forming apparatus of the disclosure is the MFP in the embodiment, it may be an image forming apparatus other than the MFP, such as a printer-only machine, as long as it is the image forming apparatus for performing a print job based on print data.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An image forming apparatus comprising:
a print device that performs a print job onto a print medium;
a sign printing circuit that causes the print device to print a sign where a glyph is present in a font corresponding to a code, based on the code included in print data; and
a sign analyzing circuit that analyzes whether or not the glyph is invalid data where the sign printing circuit is not able to cause the print device to print,
wherein, when the sign analyzing circuit analyzes that the glyph present in the font corresponding to the code of a target sign is the invalid data, the sign printing circuit causes the print device to print a specific alternative sign as an alternative to the target sign,
wherein the image forming apparatus further comprises a report printing circuit that causes the print device to print a font-analysis report indicating that the glyph of the target sign where the alternative sign is printed is the invalid data, and
wherein the font-analysis report includes:
a "format" indicating the format of the font of the sign where the alternative sign has been drawn as the alternative to the sign;
a "font name" indicating the name of the font of the invalid sign;
an "invalid character code" indicating the code of the invalid sign; and
an "error code" indicating what kind of invalid data the glyph of the invalid sign is.

2. The image forming apparatus according to claim 1, wherein the sign printing circuit causes the print device to print a sign in a color different from a color of the alternative sign, the sign being printed by the print device adjacent to the alternative sign.

3. The image forming apparatus according to claim 1, wherein the print data includes the glyph of the target sign.

4. A non-transitory computer-readable recording medium storing a sign printing program to be executed by an image forming apparatus including a print device, the print device performing a print job onto a print medium, the sign printing program causing the image forming apparatus to function as:
a sign printing circuit that causes the print device to print a sign where a glyph is present in a font corresponding to a code based on the code included in print data; and
a sign analyzing circuit that analyzes whether or not the glyph is invalid data where the sign printing circuit is not able to cause the print device to print,
wherein, when the sign analyzing circuit analyzes that the glyph present in the font corresponding to the code of a target sign is the invalid data, the sign printing circuit causes the print device to print a specific alternative sign as an alternative to the target sign,
wherein the sign printing program further causes the image forming apparatus to function as a report printing circuit that causes the print device to print a font-analysis report indicating that the glyph of the target sign where the alternative sign is printed is the invalid data, and
wherein the font-analysis report include:
a "format" indicating the format of the font of the sign where alternative sign has been drawn as the alternative to the sign;
a "font name" indicating the name of the font of the invalid sign;
an "invalid character code" indicating the code of the invalid sign; and
an "error code" indicating what kind of invalid data the glyph of the invalid sign is.

* * * * *